W. P. RYLANDER.
TIRE TOOL.
APPLICATION FILED AUG. 18, 1919.

1,358,336.

Patented Nov. 9, 1920.
2 SHEETS—SHEET 1.

Witness
E. D. Haines.

Inventor
William P. Rylander.
By H. B. Willson & Co.
Attorneys

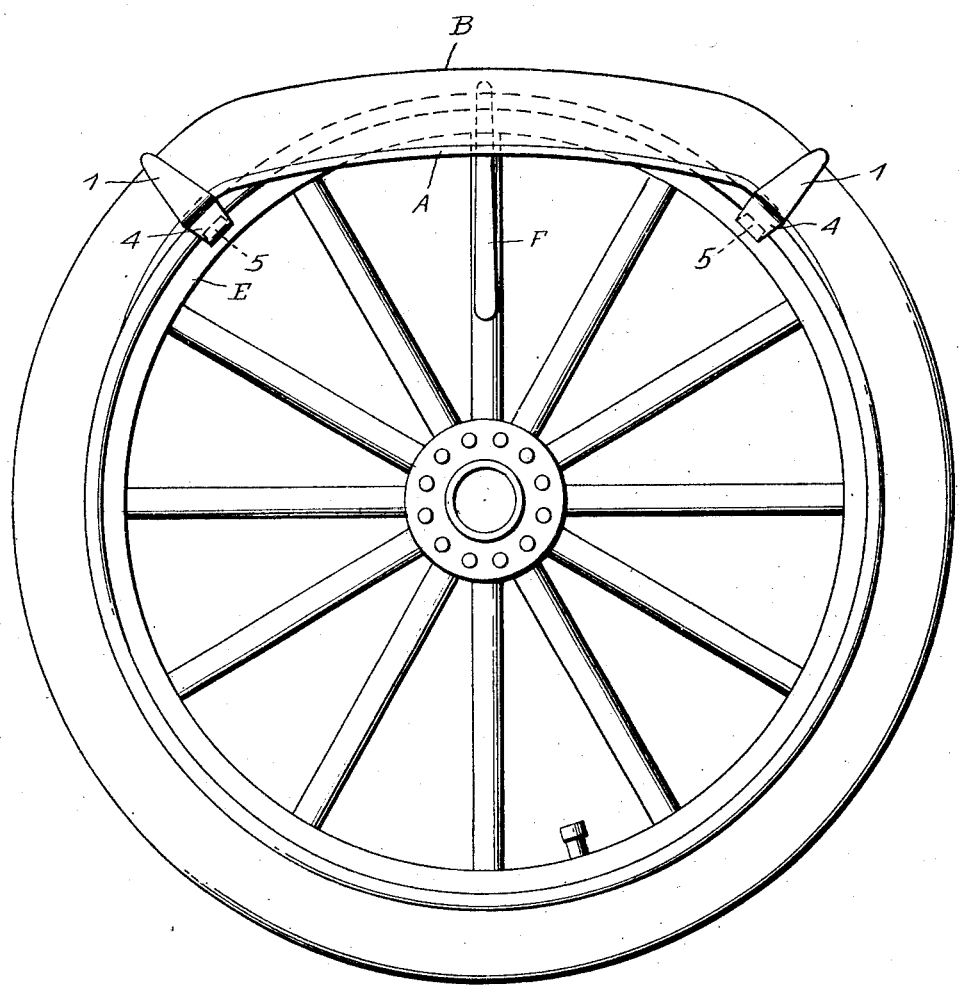

UNITED STATES PATENT OFFICE.

WILLIAM P. RYLANDER, OF SAN MARCOS, TEXAS.

TIRE-TOOL.

1,358,336.

Specification of Letters Patent.

Patented Nov. 9, 1920.

Application filed August 18, 1919. Serial No. 318,220.

*To all whom it may concern:*

Be it known that I, WILLIAM P. RYLANDER, a citizen of the United States, residing at San Marcos, in the county of Hays and State of Texas, have invented certain new and useful Improvements in Tire-Tools; and I do declare the following to be a full, clear, and exact description of the invention, such as will enable others skilled in the art to which it appertains to make and use the same.

This invention relates to automobile accessories, and more particularly to tire tools.

The primary object of the invention is to provide a tool to be used in connection with the ordinary flat bar type of tire tool for removing tire casings from vehicle rims and also in placing tire casings on their rims, the tool being of such construction and being used in such a manner that the work may be accomplished without much effort and in an extremely short length of time.

A further object of the invention is to provide a device of this character which will be extremely simple, strong, durable and inexpensive in construction, and well adapted to the purpose for which it is desired.

With these and other objects in view the invention consists of certain novel features of construction and the combination and arrangements of parts as will be hereinafter described and claimed.

In the accompanying drawings in which similar reference characters are used to designate like parts throughout the views:

Fig. 3 is a front view of a vehicle wheel illustrating a tire casing in the stage of being placed upon the rim and showing how two of the improved tire tools are used in connection with the ordinary flat bar form of tool;

Figure 1:
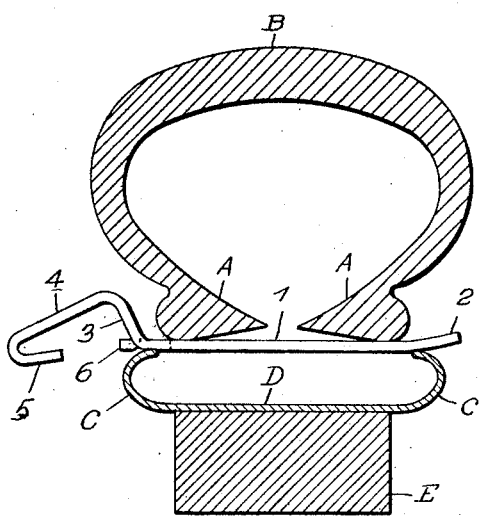
Figure 1 is a transverse sectional view through a vehicle felly, rim and casing, showing a tool constructed in accordance with this invention in use for removing the casing from the rim.

The improved tire tool comprises a plate of sheet metal which is tapered from approximately its middle to its ends, the portion of the plate from its middle to one end thereof being substantially flat as at 1 to form a lever. However, if desired, the free end of this flat portion 1 may be slightly bent as at 2 for a purpose to be hereinafter described. The plate is bent laterally at its middle as at 3, then extended in a general longitudinal direction with respect to its flat portion 1 as at 4 and finally turned inwardly upon itself at its other end as at 5, the inwardly turned portion 5 being spaced from the longitudinally bent portion 4 and having its free end disposed a short distance from the laterally bent portion 3. Extending longitudinally and substantially in alinement with the flat portion 1 of the plate at a point adjacent the laterally bent portion 3 thereof and disposed midway of the width of the plate is a tongue 6. This tongue 6 is formed by cutting or stamping an inverted U-shaped slit in the flat portion 1 of the plate and then bending the metal between the sides of the slit toward the portion 5 and substantially in alinement with the flat portion 1. For the purpose of making the tool strong and durable the plate from which it is made is comparatively thick and wide.

In removing a tire casing from an automobile rim of the clencher type, the ordinary form of flat bar tool is used to pry the beads A of the casing B from under the inturned flanges C of the clencher rim D. When this is done one of the tools constructed in accordance with the present invention is inserted alongside of the flat bar so that its flat portion rests upon the two flanges C of the clencher rim D and holds the adjacent portions of the tire beads A out of the space between the flanges C. At another point along the rim for instance eighteen or twenty inches from where the first tire tool is disposed, another one is inserted between the rim of the wheel and the tire casing in a similar manner. This bridges or holds the tire casing out of the rim in two places, and the flat bar is then used as a lever in moving the tire casing in a transverse direction with respect to the rim and prying it completely off of the same. Inasmuch as the flat portion 1 of the improved tool is slightly curved as at 2 at its free end, the tool may itself be used as a lever in prying the rim A of the tire casing from under the flanges C of the rim and possibly also in moving the tire casing in a transverse direction with respect to the rim.

Figure 2:
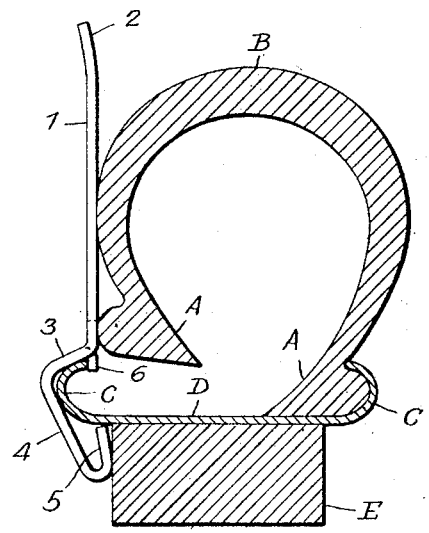
Fig. 2 is a transverse sectional view through a vehicle felly, rim and tire casing, illustrating the manner in which the tool is placed upon the rim when it is used to apply the casing to the rim.
Figure 4:
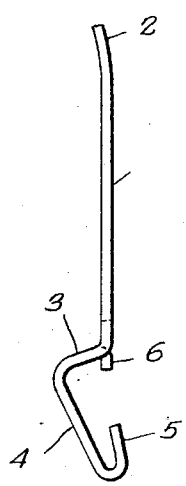
Fig. 4 is an edge view of the improved tire tool.
Figure 5:
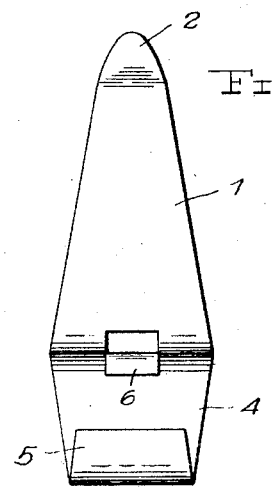
Fig. 5 is a front view of the same.

Figs. 2 and 3 illustrate the manner in which the improved tire tool is used in applying or placing a tire casing upon a rim. From Fig. 3 it will be seen that the tire casing B is inserted without the aid of tools upon as much of the rim as is possible, and at each of the places where the casing B leaves the rim and cannot be pushed by hand onto the same, one of the improved tools is placed. In this case the tongue 6 which forms a hook in connection with the laterally extending portion 3 of the plate is hooked over the flange C of the rim D across which the tire casing passes. The inturned portion 5 of the plate will then rest against the adjacent side of the felly E of the wheel and will have its free end bearing or abutting against the under side of the rim D. The tool is obviously maintained in position with its flat portion 1 extended upwardly or radially with respect to the wheel and in contact with the adjacent side of the tire casing B. An ordinary flat bar F shown in Fig. 3 may now be used as a lever in forcing the portion of the tire casing disposed between the two tire tools onto the rim, the distance between the tools being diminished a little at a time by use of the flat bar, the tool being brought up to a new position on the rim with each new hold with the bar until the casing is on. After the tire casing has been completely placed on the rim the flat portion 1 of each of the tools is pushed inwardly toward the middle of the tire causing the tool to swing upon the edge of the flange C and bringing the free end of the portion 5 from under the rim D. By tapping the bend in the plate which connects the portion 4 and 5 the tool may be slid longitudinally so as to disengage the tongue from the flange C.

From the foregoing description, taken in connection with the accompanying drawings the construction, and use of the invention will be readily understood. It will be seen that by using two or more tools of this character in connection with a flat bar or lever or the ordinary flat bar type of tire tool, tire casings can be quickly and easily applied to clencher rims or removed therefrom.

Various changes in form, proportion, and in the minor details of construction may be resorted to without departing from the spirit of the invention as defined in the claim.

What is claimed is:

A tire tool having a lever handle, a hook element carried by the inner end of the handle and having its inner end portion extending transversely of the handle to one side thereof, its intermediate portion longitudinally of the handle and in converging relation to and meeting the plane thereof and its free end portion toward the handle and terminating in spaced relation thereto, and a tongue extending from the inner end of the handle and extending longitudinally thereof in the plane of the handle toward the free end of the hook element.

In testimony whereof I have hereunto set my hand.

WILLIAM P. RYLANDER.